United States Patent [19]

Nesseth

[11] 3,875,987
[45] Apr. 8, 1975

[54] DETACHABLE FLEXIBLE TRACK FOR TRACTOR WHEELS AND THE LIKE

[76] Inventor: Clifford A. Nesseth, Box 29, Rt. 1, Dafter, Mich. 49724

[22] Filed: Aug. 3, 1973

[21] Appl. No.: 385,227

[52] U.S. Cl. ............... 152/226; 222/178; 222/189
[51] Int. Cl. .......................................... B60c 27/02
[58] Field of Search............ 152/225, 226, 217–219, 152/233, 173, 175, 187, 189, 178

[56] References Cited
UNITED STATES PATENTS
| | | | |
|---|---|---|---|
| 2,290,398 | 7/1942 | Wellington | 152/226 |
| 2,352,174 | 6/1944 | Barrows | 152/226 |

FOREIGN PATENTS OR APPLICATIONS
| | | | |
|---|---|---|---|
| 501,553 | 7/1930 | Germany | 152/225 |
| 524,716 | 8/1940 | United Kingdom | 152/226 |

Primary Examiner—Stanley H. Tollberg
Assistant Examiner—Norman L. Stack, Jr.
Attorney, Agent, or Firm—Robert G. Mentag

[57] ABSTRACT

A detachable, flexible track for attachment to the outer periphery of a vehicle wheel tire to enable a vehicle which is stalled in snow or mud to obtain traction and drive out of the stalled position. The flexible track includes a plurality of track tread members for mounting in an operative, transverse position on the outer periphery of a vehicle wheel. Each of the track tread members includes a pair of laterally spaced apart, elongated bars. Attachment links are releasably connected to each end of each of the track tread members. A chain is operatively disposed on each side of the vehicle wheel tire for releasable engagement with each of the attachment links on each respective side of the tire.

1 Claim, 13 Drawing Figures

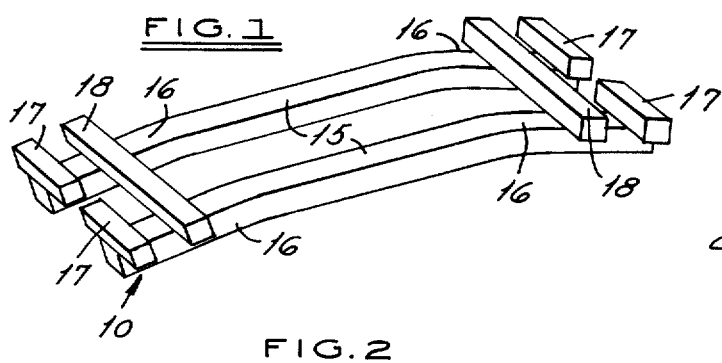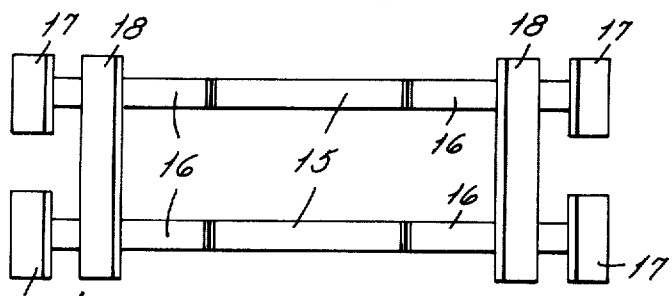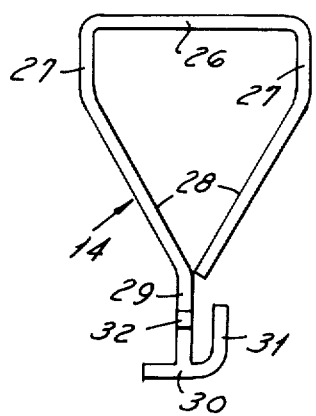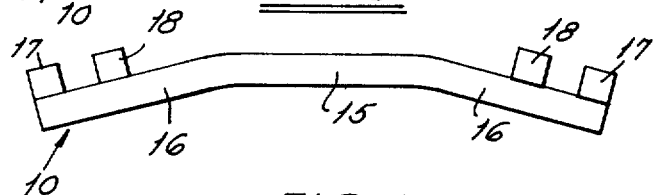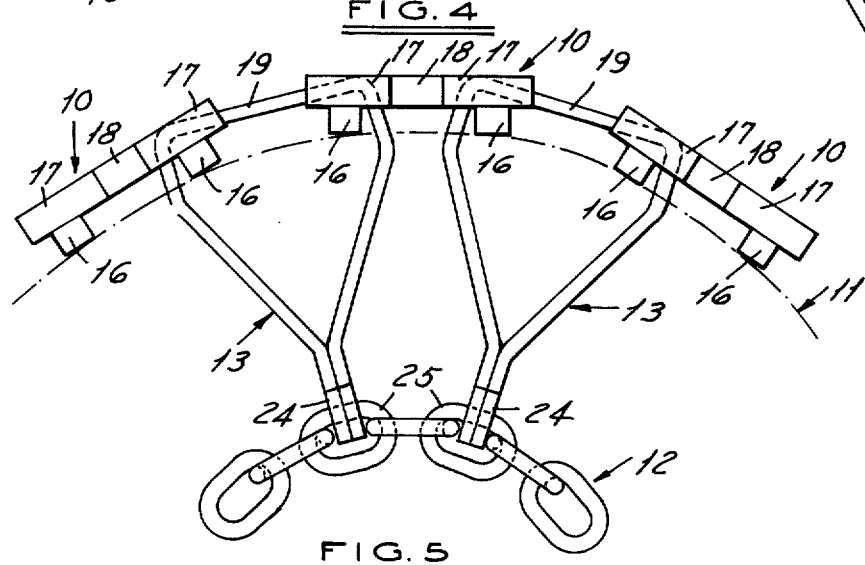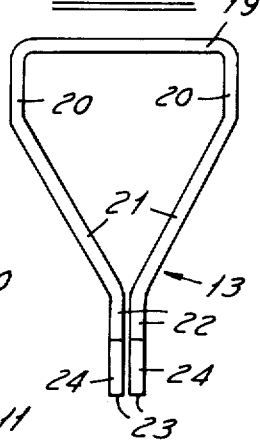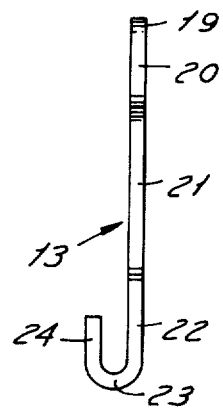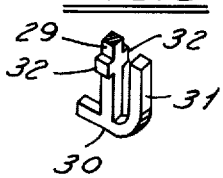

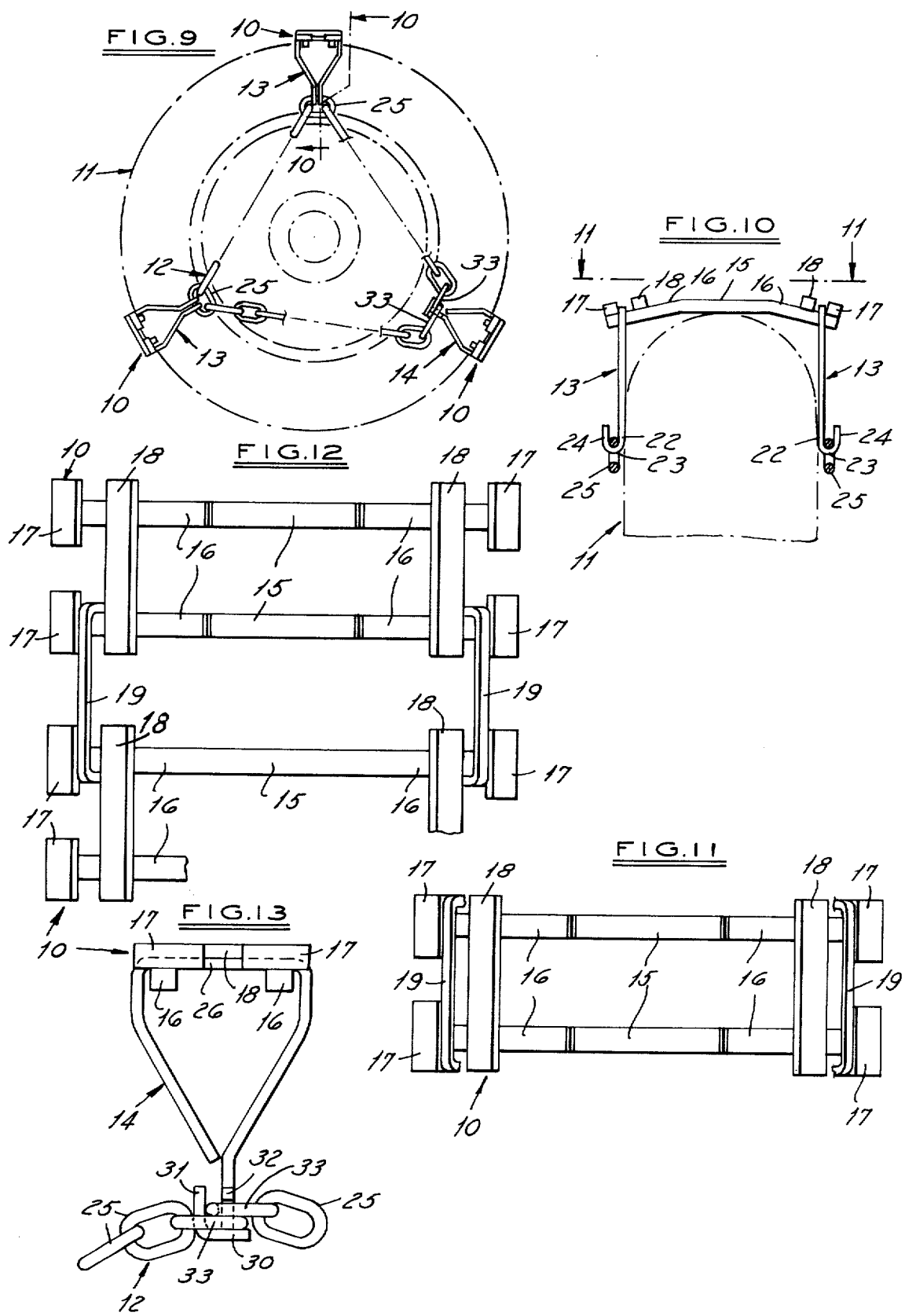

3,875,987

DETACHABLE FLEXIBLE TRACK FOR TRACTOR WHEELS AND THE LIKE

SUMMARY OF THE INVENTION

This invention relates generally to the detachable vehicle tire track art, and more particularly, to a detachable flexible track for mounting on the outer periphery of the tire of a vehicle to provide traction for movement in mud, snow and the like.

Heretofore, detachable tracks have been provided for mounting on tractor wheel tires and the like to provide additional traction for movement in mud or snow. However, a disadvantage of such prior art tracks is that they are costly and require the use of tools to apply the necessary bolts or pins to assemble the track. Accordingly, it is an important object of the present invention to provide a novel and improved detachable, flexible track for attachment to vehicle wheel tires which overcomes the aforementioned disadvantages of the prior art tracks.

It is another object of the present invention to provide a novel and improved detachable, flexible track, for attachment to the outer periphery of a vehicle wheel tire to provide added traction, which is simple and compact in construction, economical to manufacture, and efficient in operation.

It is another object of the present invention to provide a detachable, flexible track for attachment to the outer periphery of a vehicle wheel tire without the need of any tools for mounting the track on said tire.

It is a further object of the present invention to provide a detachable, flexible track for attachment to the outer periphery of a vehicle wheel tire which can be formed to provide a full track around the outer periphery of the tire, or a partial track around the periphery of the tire.

It is still a further object of the present invention to provide a novel and improved detachable, flexible track for attachment to the outer periphery of a vehicle wheel tire, and which includes a plurality of track tread members for mounting in operative transverse positions on the outer periphery of a vehicle wheel tire, attachment means releasably connected to each end of each track tread member on each side of the tire and, fastening means on each side of the tire and releasably attached to each attachment means on each respective side of the tire, for securing the track tread members on the tire.

Other objects, features and advantages of this invention will be apparent from the following detailed description, appended claims, and the accompanying drawings.

BRIEF DESCRIPTION OF THE DRAWINGS

FIG. 1 is a perspective view of a track tread employed in carrying out the principles of the present invention.

FIG. 2 is a top plan view of the track tread illustrated in FIG. 1.

FIG. 3 is a front elevational view of the track tread illustrated in FIG. 2.

FIG. 4 is a fragmentary, side elevational view of a full flexible track made in accordance with the principles of the present invention.

FIG. 5 is a fragmentary, perspective view of the lower end of a splice link employed in carrying out the principles of the present invention.

FIG. 6 is a side elevational view of a splice link employed in carrying out the principles of the present invention.

FIG. 7 is a side elevational view of a side link employed in carrying out the principles of the present invention.

FIG. 8 is a right side elevational view of the side link structure illustrated in FIG. 7.

FIG. 9 is a side elevational view of a partial flexible track structure employing a multiple of track treads, but less than enough to make a complete track.

FIG. 10 is a fragmentary, elevational sectional view of the track structure illustrated in FIG. 9, taken along the line 10—10 thereof, and looking in the direction of the arrows.

FIG. 11 is an enlarged top plan view of the structure illustrated in FIG. 10, taken along the line 11—11 thereof, and looking in the direction of the arrows.

FIG. 12 is a plan view of the full track structure illustrated in FIG. 4.

FIG. 13 is a side elevational view of a splice link, and showing the same attached to a track tread and having the ends of a chain attached to the lower end thereof.

DESCRIPTION OF THE PREFERRED EMBODIMENT

Referring now to the drawings, and in particular to FIGS. 1, 2 and 3, the numeral 10 generally designates a vehicle track tread which is used in multiple numbers in making a flexible track for attachment to tractor wheels and other vehicle wheels. FIG. 9 illustrates a partial flexible vehicle track employing three of the track treads or cleats 10, and showing the track mounted on the outer periphery of a tractor wheel tire 11.

As shown in FIGS. 9 and 10, the track treads 10 are disposed crosswise on the outer periphery of a vehicle wheel tire 11 and secured together on each side of the tire 11 by a plurality of side attachment links 13, a chain 12 and a splice or connecting attachment link 14.

As best seen in FIGS. 1, 2 and 3, each of the track treads or cleats 10 includes a pair of elongated, laterally spaced apart tread members which are each shown in the form of an elongated bar having a rectangular cross section and made from a suitable material, as metal. Each of the tread bars includes a central bar portion 15 and two integral tread bar end portions 16 which are disposed at an acute angle relative to the longitudinal axis of the central portion 15, so as to form a substantially convex upwardly arcuate shape, as shown in FIG. 3. The tread bar end portions 16 are disposed so as to angle downwardly relative to their position shown in FIG. 3, so that when a tread 10 is mounted on a vehicle tire, it will substantially conform to the radial cross section form of a tire. The elongated tread bars are secured together by a pair of spaced apart braces, shown in the form of elongated rectangular metal rods 18, which are secured to the tread bars by any suitable means, as by welding. The braces 18 are disposed perpendicularly to the longitudinal axis of the tread bars and inwardly from the ends of the tread bar portions 16. A link attachment bar 17 is secured to each of the tread bar end sections 16, at the ends thereof, and on the upper sides thereof, as shown in FIGS. 2 and 3.

As shown in FIGS. 9 and 10, the track treads or cleats 10 are mounted in an operative position on the outer periphery of the vehicle wheel tire 11 and secured in place by means of a plurality of side attachment links 13. As shown in FIGS. 7 and 8, each of the side attachment links 13 is formed to provide a loop on the upper end thereof and a pair of hooks on the lower end thereof, with the upper loop end being adapted to be mounted around the attachment bars 17, as shown in FIGS. 11 and 12, and the lower hook ends being adapted for receiving a link of the chain 12, as shown in FIG. 5.

As shown in FIG. 7, each of the side attachment links 13 is formed from suitable elongated wire rod which is square in cross section and which is bent to the form shown in FIGS. 6 and 7. As shown in FIG. 7, the upper loop end of the side attachment link 13 is formed by a transverse upper end portion 19 to which is integrally attached a pair of upper side portions 20 which are disposed at right angles to the transverse portion 19. Integrally connected to the side portions 20 are the upper ends of a pair of inwardly converging lower side portions 21 which meet at the two integral straight portions 22 which form the inner sides of the lower hook ends. Each of the straight, longitudinally disposed side portions 22 is integral with a bight portion 23 and a straight upwardly extended portion 24 to complete each of the hook members on a side attachment link 13.

As shown in FIG. 6, each of the splice attachment links 14 is formed from a wire rod material of the same type as used in forming the side attachment links 13. Each of the splice attachment links 14 includes a transverse upper end portion 26, to which is integrally formed at each of the ends thereof a pair of downwardly extended upper side portions 27 which are disposed perpendicularly to the transverse portion 26. A pair of lower side portions 28 are integrally connected to the lower ends of the upper side portions 27 to form an upper end loop portion. Integrally formed on the lower end of one of the lower side portions 28 is a centrally disposed and longitudinally extended lower end arm 29, to the lower end thereof a transverse arm 30 is integrally attached. Integrally formed on one end of the transverse arm 30, and upwardly extended and spaced from the arm 29, is a second arm 31 which forms a hook member with the arms 29 and 30. A pair of outwardly extended stop members 32 are formed on opposite sides of the lower end arm 29, in a position approximately opposite the upper end of the hook portion arm 31.

In use, the flexible track of the present invention may be applied in a partial track form, as illustrated in FIG. 9, or in a full track form, as illustrated in FIGS. 4 and 12. The track is adapted to be used in situations where a tractor or the like is stuck in mud or snow. In such situations, the tire tread becomes loaded with mud or snow, and presents a smooth wheel to the ground surface which does not provide any traction for the vehicle, and the wheels merely spin uselessly. The track treads 10 of the flexible track of the present invention provide a means for digging into the mud or snow, and provide traction to a vehicle wheel to permit the vehicle to quickly and easily move itself out of a position where it may be stuck in snow or mud.

A partial flexible track, in accordance with the present invention may be quickly and easily mounted on a vehicle tire, as illustrated in FIG. 9, by disposing three of the track treads 10 in even positions around the tire, as for example, 120° apart. In the use of a partial track, the side attachment links 13 are mounted with the upper loop end around both of the attachment bars 17 on one end of a track tread 10, as illustrated in FIGS. 10 and 13. In the partial track arrangement of FIG. 9, four side attachment links 13 and two splice attachment links 14 are used. As shown in FIG. 9, a length of chain 12 is mounted with an individual link 25 mounted over the hooks on the two side attachment links 13, and with the end links 33 of the chain 12 mounted around the lower end of the splice attachment link 14, as shown in FIG. 13. One of the chain end links 33 is first mounted over the hook arms 30 and 31, and then it is moved upwardly against the stop members 32. A second chain end link 33 is then moved up over the lower arm 30 into the position shown in FIG. 13 to lock the ends of the chain 12 securely in place.

The tension on the chain 12 may be increased by hooking the next to the last chain link onto the splice attachment link 14, instead of the extreme chain end link 33, and so on. It will be understood that each side of the track would be provided with the last described arrangement of FIG. 9 with two side attachment links 13, a splice attachment link 14 and a length of chain 12.

When it is desired to increase the ground engaging friction, then a full track may be mounted on a vehicle wheel tire by disposing the appropriate number of track treads 10 around the periphery of the tire and connecting them together in the manner shown in FIGS. 4 and 12. It will be seen that when a full track arrangement is used, the upper loop ends of the attachment links 13 and 14 are looped around adjacent tread attachment bars 17 to secure the track treads 10 in position around a vehicle wheel tire.

Experience has shown that the flexible track of the present invention is an economical and efficient means for quickly and easily getting a tractor or other vehicle out of a helpless condition wherein the wheels are buried in mud or snow.

It will be understood that the cross sectional shape of the tread bars formed by the tread member portions 15 and 16 may be other than rectangular, as for example, triangular. It will also be understood that no tools are required for assembling the track on a vehicle wheel tire, since there are no bolts, nuts, pins or the like used for securing the track in an operative position on a tire. If the tractor or other vehicle wheel is stuck in a hole, the partial track arrangement of FIG. 9 can be used, with two of the track treads 10 disposed on the wheel tire on opposite sides of the hole, and the third track tread 10 on the upper side of the wheel tire. It is not necessary to jack the vehicle up or to get underneath to mount the track of the present invention in an operative position on a vehicle tire. It will also be understood that larger tires will require a greater number of the tread members 10, and a larger size chain.

While it will be apparent that the preferred embodiment of the invention herein disclosed is well calculated to fulfill the objects above stated, it will be appreciated that the invention is susceptible to modification, variation and change.

What is claimed is:

1. A detachable flexible track for attachment to the outer periphery of a vehicle wheel tire comprising:
   a. a plurality of track tread members for mounting in operative transverse positions on the outer periphery of a vehicle wheel tire;

b. each of said track tread members including a pair of laterally spaced apart, ground engaging elongated members which are disposed transversely to the periphery of a vehicle wheel tire, and which are fixed together by a pair of side members disposed perpendicular to the ground engaging elongated members;

c. each of said ground engaging elongated members of each track tread member is provided with an attachment bar at each end thereof;

d. a plurality of attachment links on each side of the tire with each attachment link having a loop on one end for releasably connecting a ground engaging elongated member from one track tread member to the adjacent ground engaging elongated member of an adjacent track tread member by having the loop disposed over the attachment bars of the two adjacent ground engaging members;

e. each of said attachment links having a hook on the other end thereof; and, f. an elongated chain on each side of the tire for releasable engagement with the hooks on the attachment links on each respective side of the tire for securing the tread members on the tire.

* * * * *